May 7, 1929. E. R. SMITH 1,712,055
MEASURING INSTRUMENT
Filed Feb. 15, 1926 2 Sheets-Sheet 2
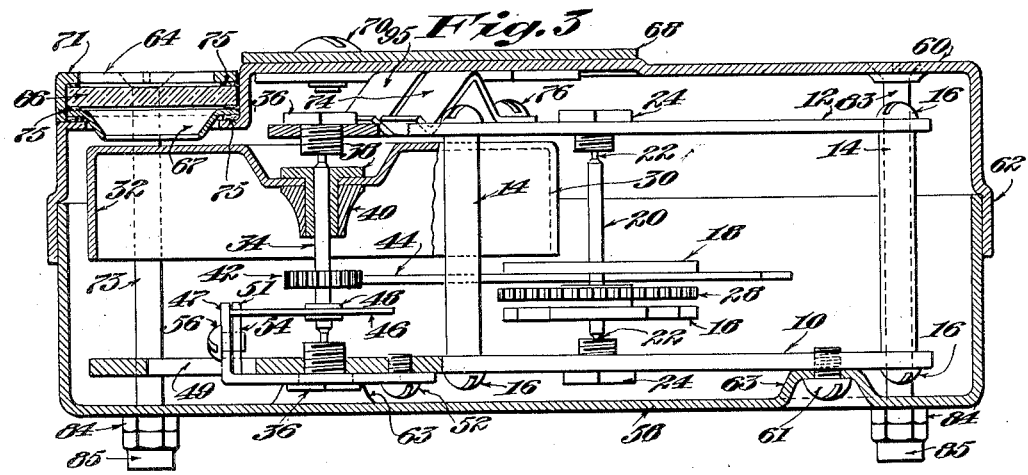
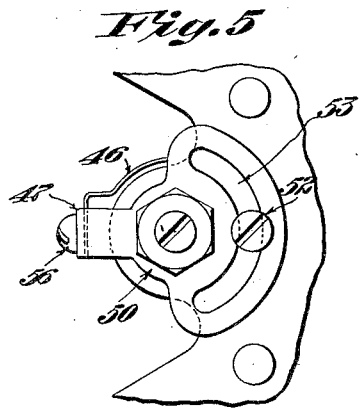
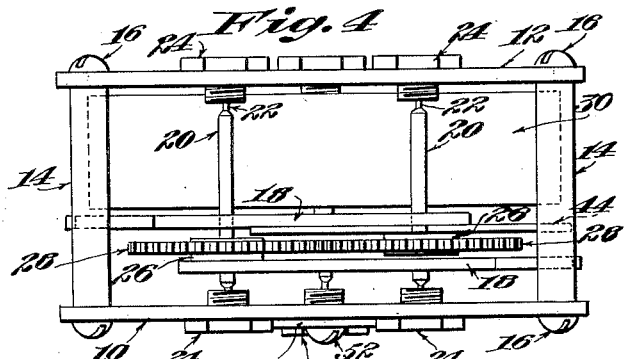
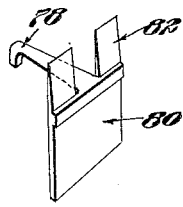
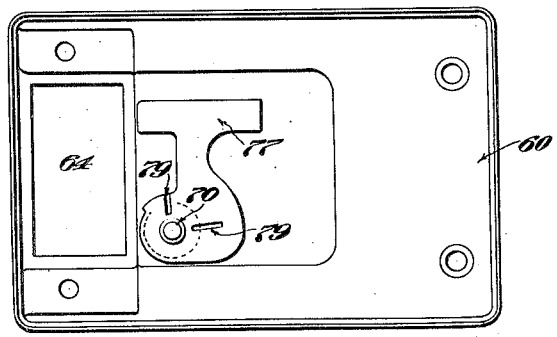
Inventor
Edward R. Smith
by Francis N. Dakin
his Atty.

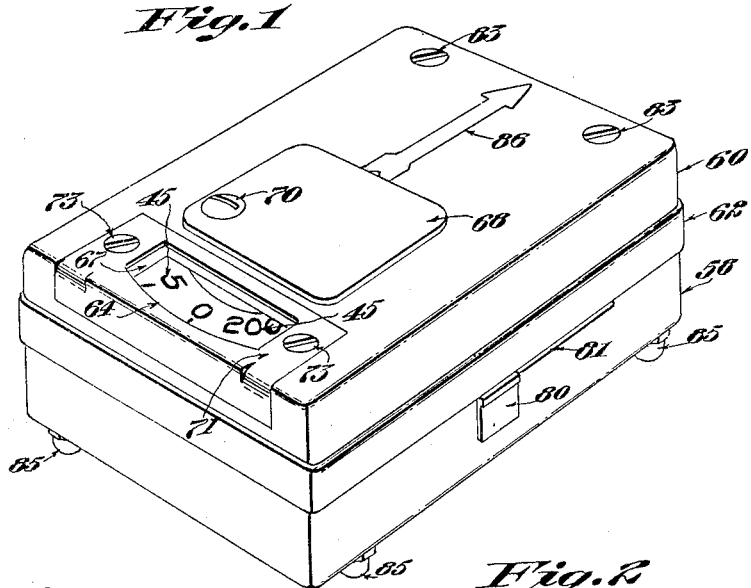
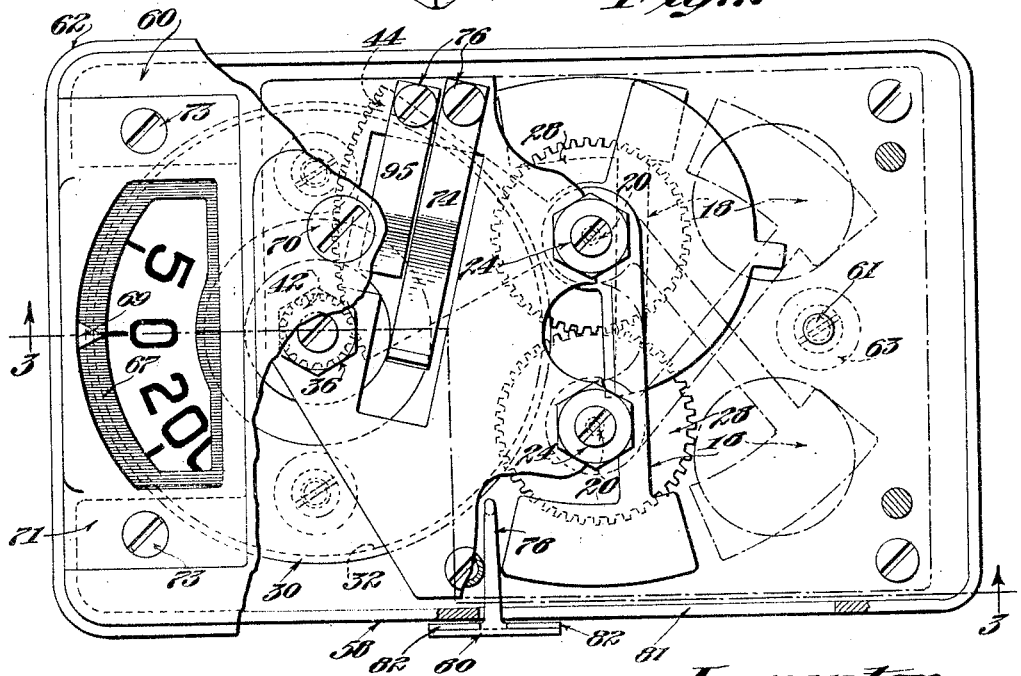

Patented May 7, 1929.

1,712,055

UNITED STATES PATENT OFFICE.

EDWARD R. SMITH, OF MALDEN, MASSACHUSETTS, ASSIGNOR TO MUTHER MANUFACTURING COMPANY, OF BOSTON, MASSACHUSETTS, A CORPORATION OF MASSACHUSETTS.

MEASURING INSTRUMENT.

Application filed February 15, 1926. Serial No. 88,269.

This invention relates to an instrument for measuring the acceleration or deceleration of moving bodies and is particularly designed for measuring the decelerating action of brakes on automobiles and other vehicles for the purpose of testing the efficiency thereof.

The rapidly increasing use of motor vehicles of all kinds during the past decade with the consequent congestion of the highways throughout the country has made the use of efficient braking mechanism a matter of prime importance both to the users of such vehicles and to the public at large. The alarming increase in collisions and other accidents to motor vehicles and in injuries to pedestrians has attracted countrywide attention. That a large percentage of such accidents have been due to defective brakes is generally admitted and it follows that the eradication of this cause of disaster would greatly reduce the number of deaths and injuries and the property losses. Defective brakes are due either to ignorance or neglect or to a combination of both, for the brakes on a motor vehicle can be kept in efficient condition by a little attention given them from time to time for adjustment and by the renewing of the brake lining when necessary.

During the past two years the brake efficiency question has been given more serious consideration and certain tests have been made in various parts of this country which have disclosed a most amazing condition of neglect in the care of brakes which seems to be more or less general. In the tests made, it was found that over fifty percent of pleasure cars and nearly seventy percent of trucks in use were travelling at a high rate of speed with inefficient and in many cases useless braking apparatus.

A common way of testing brakes has been to drive the car to be tested at a predetermined speed, as for instance, at the rate of twenty miles per hour, apply the brakes at a certain designated point and note the distance in linear feet required to bring the car to a dead stop. This method is slow and cumbersome, requiring two or more checkers and more or less measuring afterwards, thereby limiting the number of cars which can be tested in a given time. Furthermore, this method is inaccurate because it involves certain factors which vary in different cases and cannot be definitely determined, such as the reaction time of the operator in applying the brakes and the exact speed at which the machine is moving. For instance, the inaccuracy of the ordinary commercial speedometer may entirely nullify the test by giving results widely at variance with the truth. Because of these facts, there exists a pressing need for an instrument which, independently of the reaction time of the driver, the speed of the vehicle or other factors, will in a positive and accurate manner indicate whether or not the braking mechanism on a vehicle is efficient and further will indicate it in a manner which is apparent to the man of ordinary intelligence.

Attempts have been made heretofore to devise instruments employing pendulums or weighted levers, for measuring the deceleration of a motor vehicle when the brakes were applied in order to determine the efficiency of the brakes, but most of these instruments have been impossible to read accurately because of the oscillation of the dial or indicator through a wide arc. To reduce the oscillations, magnets and other damping means have been employed but even then the instruments have been exceedingly difficult to read and are only approximate in their results. So far as I am informed no instrument has heretofore been devised for testing the efficiency of brakes which has been sufficiently accurate to make its indications acceptable as evidence before a court of law.

The principal object of my invention is the provision of a small compact device adapted for measuring the acceleration or deceleration of a moving body and more particularly the rate of change of speed of a motor vehicle.

Another object of the invention is the provision of a device of the character described which may be adjusted in accordance with a predetermined standard of efficiency and which will indicate in a positive, rapid and accurate manner whether or not the brakes of the vehicle being tested comply with that standard.

A further object of the invention is the provision of means whereby the device may be easily and with facility adjusted to different standards of efficiency to test different classes of vehicles.

Other objects of the invention will be more specifically set forth and described hereinafter.

My invention contemplates an instrument designed primarily for indicating rate of change of speed of moving bodies but which may be used also for other purposes, such as the determination of gradients, of the power or efficiency of an engine and various other purposes. The form of the invention shown herein comprises a small device of pocket size particularly adapted for testing the efficiency of automobile brakes. In this embodiment of the invention, the instrument comprises a pair of weighted levers pivotally mounted and connected up to move in unison and to operate indicating means for showing deceleration. Means are also provided for adjustably setting the instrument at any predetermined acceleration or deceleration so that only readings in excess of this setting will be indicated.

One of the principal features of my invention, therefore, consists in providing adjustable means for setting the instrument at any deceleration so that no movement of the indicating means is produced unless the deceleration caused by the application of the brakes exceeds the predetermined setting at which the instrument is adjusted. This accomplishes a result of primary importance so far as the brake testing operation is concerned because there is only one essential fact to be determined by such a test and that is whether the brakes being tested come within the standard of efficiency laid down. The degree of inefficiency of the brakes is of small importance and is of no great moment to the tester so long as they fail to prove efficient. If the instrument is set for just a trifle lower than the lowest deceleration for efficient brakes, it is apparent that there will be no movement of the indicating means unless the brakes produce a higher deceleration than that at which the instrument is set, in which case the brakes are efficient. If the indicating means does not move during the test, then the brakes are inefficient and must be serviced. The result is an instrument which positively, rapidly and accurately decides the main issue. The fact that the setting instrument is adjustable permits the device to be set to conform to various standards and therefore to be used for testing different classes of vehicle.

In the drawings, illustrating one embodiment of my invention, Figure 1 is a view in perspective of a brake testing instrument constructed and adapted to be operated in accordance with my invention; Fig. 2 is a plan view of the same, the major portion of the top cover of the instrument casing being cut away to expose the mechanism; Fig. 3 is a longitudinal vertical sectional view on line 3—3 in Fig. 2; Fig. 4 is an end elevation of the frame and mechanism looking from right to left in Fig. 3; Fig. 5 is a bottom plan view of the means for regulating the tension of the hair spring; Fig. 6 is a bottom plan view of the casing cover showing the means for locking the parts against vibration when the instrument is not in use; and Fig. 7 is a view in perspective of a device for setting the levers in the instrument at any predetermined point for testing purposes.

Referring to the drawings, illustrating one embodiment of the invention, there is shown a frame comprising a lower base-plate 10 and an upper plate 12 secured together in spaced relation by a plurality of posts 14, the opposite ends of each being internally threaded to receive screws 16 for holding the frame rigidly together. Within the frame may be pivotally mounted a pair of weighted levers 18 adapted to swing in overlapping relation in horizontal planes. Each lever may be mounted on a vertical shaft 20 having reduced ends 22 journalled in jewelled bearing nuts 24 threaded through the plates 10 and 12. The pivoted end of each lever may be in the form of a hub 26 extended on one side thereof so that when two are mounted on their respective shafts 20 within the frame at opposite sides thereof, they may lie and swing in overlapping relation.

For securing movement of the two levers 18 in unison, a gear 28 may be secured on the hub 26 of each lever in such position as to engage the gear on the other lever when the two are assembled, both gears being of the same size.

Any suitable indicating means may be provided and arranged to be operated by said levers and one form of such means is shown comprising a horizontal disk dial 30 having its periphery turned down to form a flange 32 to give it stiffness and stability. The dial may be fixedly mounted on a dial shaft 34 having its opposite ends reduced to engage jewelled bearings in nuts 36 threaded through the two plates of the frame. The center of the dial may be depressed and bored to be inserted into a hub formed of two members 38 and 40, the hub being fixed to the dial shaft. For rotating the dial when the pivoted levers move, a pinion 42 may be fixed on the shaft 34 and adapted to mesh with a gear segment 44 fixed on one of the lever shafts 20. The face of the dial may be provided with suitable graduations 45 of a character and so arranged as to indicate the unit of measurement in accordance with the use to which the instrument is to be put.

To hold the dial normally at the zero point and to return the levers to normal position when thrown out by a change in velocity, a hair spring 46 may be secured at its inner end to a hub 48 fixed on the dial shaft 34 and the outer end may be held by a segment bracket 50 (Fig. 5) centrally and pivotally mounted in the lower bearing screw nut 36 for the dial shaft and in engagement with the bottom face of the lower plate 10 of the frame. On its opposite side the segment may be provided with an extension 47 which is turned upwardly through an opening 49 in the lower plate 10 and the outer end of the hair spring is gripped firmly between said upturned end 47 and a square washer 51 held by a screw 56 threaded through the said end. A semi-circular slot 53 may be cut in the segment and a screw 52 threaded into the lower plate 10 serves to hold the segment in any adjusted position. By loosening the screw 52 and turning the segment in the nut 36 as a pivot the tension of the hair spring may be adjusted to a fine degree and when so adjusted the screw 52 may be again tightened to hold the segment in adjusted position.

The frame and mechanism carried thereby may be inclosed in a suitable casing or box comprising a body-portion 58 of usual form and a cover 60 having a depending flange 62 to lap over and enclose the upper edge of the body-portion as shown in Figure 1. Screws 61 located in countersunk portions 63 of the base of the body-portion 58 may be threaded through the lower plate 10 of the frame for holding it firmly fixed in the casing and yet permitting its removal therefrom when necessary.

The cover 60 may be provided with a suitable countersunk opening 64 protected by a plate 66 of glass or other transparent material to permit readings of the dial to be taken. A skeleton frame 67 may be mounted underneath the glass 66 to give the opening a finished appearance and to carry an arrow 69 to indicate the point at which readings are taken. A skeleton plate 71 may be fastened to the top of the cover to hold the glass and frame 67 in place and gaskets 75 may be interposed between the edges of the various parts to protect them from injury and from movement.

A slide 68 may be pivotally mounted on the top surface of the cover 60 on a screw 70 for closing the dial opening 64 when the instrument is not in use; which slide may also be utilized for locking the mechanism in position to prevent movement and vibration thereof when the instrument is being carried in the pocket or when it is not in use. For this purpose, a spring 74 may be fastened by a screw 76 to the upper plate 12 of the frame in position to have its free end bear down upon the top face of the dial when said spring is depressed. The spring is bent upwardly midway in position to be engaged by a T-plate 77 rigidly secured on the screw 70 on the under surface of the top of the cover 60 so that it moves in unison with said slide 68 and when said slide is turned from the operative position shown in Figs. 1 and 3 to an inoperative position covering the dial opening, the T-member 77 engages the elevated portion of the spring 74 and presses its free end down upon the dial to hold it fixed against rotary movement. When the dial is fastened the levers are likewise fixed because of the gear connections between the two.

To hold the slide either in an operative or an inoperative position, a spring 95, similar to the form of the spring 74 may be secured by a screw 76 to the plate 12 and the T-plate 77 may be provided with two slots 79 arranged at right angles to each other and in positions to receive the elevated portion of the spring 95 when the cover is in one position or the other. The spring 95 is so arranged that its elevated portion exerts an upward pressure against the under face of the T-plate and tends to lock the plate against swivelling movement when said elevated portion engages one or the other of said slots. The cover may be moved from one position to the other, however, by exerting a slight pressure to release the spring from the slot.

Any suitable means, capable of adjustment, may be employed for setting the instrument in a predetermined position so that it will not indicate any acceleration or decleration unless the actual amount in each case is greater than the predetermined amount for which the instrument is set and such means may be applied either to the dial or to the levers. One form of such means is shown as applied to the levers and consists of a small arm 78 carried by a plate 80, the plane of said plate being perpendicular to the longitudinal axis of said arm and said plate being so formed that it may be inserted between the cover 60 and the body-portion 58 of the casing and moved from the outside for adjustment without opening the casing. The plate 80 is provided with two upwardly extending bevelled fins 82 which lie between the upper edge of the side of the body-portion and the flange 62 of the cover on that side and is frictionally held thereby. That side of the body-portion may be provided with a suitable slot 81 for the passage of the arm 78 so that the plate may be moved along the side of the casing. The arm is adapted to engage the end portion of one of the weighted levers and to hold it in a forward position. When the plate is moved along the side of the casing to throw the lever 18 forwardly, as for instance, shown by the broken lines in Fig. 2, the dial will be turned thereby and the amount of adjustment will be indicated by said dial. The fins 82 should be of such thickness to secure a binding effect between them on one hand and the two parts of the casing on the other hand so that some pressure may be required to move the plate 80 for adjustment and thereby accidental displacement of the adjustment made impossible.

For convenience in handling the instrument, the cover may be secured to the body-portion by a plurality of screw headed rods 83 having their ends threaded to each receive a nut 84 and a lock-nut 85 on the bottom of the body-portion of the casing. The locknuts 85 may be of such form as to serve as supports or legs for the instrument when it is placed on a level surface. The top of the cover 60 may also be marked with an arrow 86 to assist in positioning the device when in use.

In the use of my invention, such as for instance, in noting the deceleration of motor vehicles for determining the efficiency of brakes the instrument may be placed upon the floor of the car or upon any other support in the car which is parallel with the roadway with the arrow 86 pointing in the exact line of the direction of movement of the car. The graduations shown on the dial in the drawings are designed to indicate the equivalent number of feet in which the automobile could stop under the influence of the brakes if the brakes were applied from a speed of twenty miles per hour. The actual speed of the car at the moment of application of the brakes is inconsequential as the instrument indicates and measures deceleration which, being the rate of change of speed, is therefore, independent of the actual speed at which the test is made. Normally, on an instrument of this class, the dial graduations would indicate deceleration in terms of feet per second, but in order to comply with the terminology established by previous practice in brake testing, equivalent stops from a speed of twenty miles per hour were calculated for corresponding deceleration, and ploted on the dial. These graduations, of course, are merely illustrative because other types of graduations with other standards may be employed if desired. In testing a pleasure car, for instance, going at the rate of twenty miles an hour, the car should be brought to a full stop within forty-five feet if the brakes are efficient. Unless the car stops within that distance, the brakes are inefficient. The plate 80 should, therefore, be adjusted to a position which will throw the dial around to indicate a distance slightly in excess of forty-five feet, for instance to forty-six feet. It is then ready for use. The checker controlling the test sits in the car in a position where he can observe the actions of the driver and note the instrument. At his pleasure, the checker notifies the operator of the car to apply the foot brakes with full force. If the car makes beter than a forty-six foot stop when the brakes are applied, there will be a movement of the dial in the instrument and the amount of this movement will vary with the difference between a forty-six foot stop and the actual stop made. If the car makes a twenty foot stop, the dial will move around a considerable distance, if the car makes a forty-five foot stop, there will be no appreciable or noticeable movement of the dial and if the car makes a forty-six foot stop or longer, no movement of the dial will result. The checker is thereby enabled to note instantly whether the brakes are efficient or inefficient. If the dial moves at all they are efficient but if there is no movement of the dial they are inefficient.

In making tests of trucks, as the standard is usually different than for pleasure cars, the point at which the plate 80 is set is correspondingly different. It is apparent that my instrument may be adjusted at any point so that it is capable of complying with a number of different standards for different classes of cars. This is of material advantage.

Although I have shown my invention as embodying a plurality of weighted levers, it is apparent that it may be applied to other forms of construction, those for instance, in which but one weighted lever is used operating in a vertical plane. It is also apparent that various forms of means may be used for adjusting such instruments in accordance with my invention and it is to be understood that my invention is not to be limited to the specific form herein shown and described but is to be construed broadly within the purview of the following claims.

What I claim is:

1. In a device of the character described, the combination of a pivotally mounted mass having its center of gravity removed from its pivot, means for indicating the movement of said mass from a normal position and means for setting said pivoted mass away from the normal position to prevent indication by said indicating means unless the mass is subjected to a force which would, under normal circumstances, produce a movement in excess of a movement from the zero point to the point of setting.

2. In a device of the character described, the combination of a pivotally mounted weighted lever having its center of gravity outside its pivot point, means for indicating the amount of movement of said mass away from a normal position and means for setting said pivoted lever at a distance from said normal position.

3. In a device of the character described, the combination of a pivotally mounted weighted lever having its center of gravity outside its pivot point, means for returning said lever to normal position after being moved out of normal position, means for indicating the movement of said lever away from a normal position and means for setting said lever at a distance from said normal position.

4. In a device of the character described, the combination of a pivotally mounted weighted lever having its center of gravity outside its pivot point, means for indicating the amount of the movement of said lever from its normal position and a stop for setting said lever away from its normal position to prevent any movement of said indicating means unless said lever is subjected to an impetus which would move it in excess of a movement under normal conditions from the normal point to the point of setting.

5. In a device of the character described, the combination of a pair of weighted levers pivotally mounted in overlapping relation and adapted to move in horizontal planes, means for causing said levers to move in unison, an index actuated by the movement of said levers, means for returning said levers to normal position and means acting on a movable part for setting said levers away from normal position; said means being adjustable for varying the setting point.

6. In a device of the character described, the combination of a closed casing provided with a slot in one side, a frame fixed within said casing, a pair of weighted levers pivotally mounted within said frame in overlapping relation, each of said levers having its center of gravity outside its pivot point, gearing connecting said levers, an index actuated by the movement of said levers, means for returning said levers to a normal position, and a stop mounted on the outside of said casing and projecting in through said side slot for setting said levers away from said normal position.

7. In a device of the character described, the combination of a box-like casing comprising a body-portion, provided with a slot in one side and a cover, said cover having a depending flange fitting over the upper edge of said body-portion, a frame within said casing, a pair of weighted levers pivotally mounted within said frame and each having its center of gravity outside its pivot point, gearing connecting said levers, an index actuated by the movement of said levers, means for returning said levers to normal position and a stop slidably mounted between the said cover and said body-portion of said casing and projecting inwardly through the slot in said body-portion for setting said weighted levers away from said normal position.

8. In a device of the character described, the combination of a casing, a frame fixed in said casing, a pair of weighted levers pivotally mounted in said frame in overlapping relation, gearing connecting said levers, an index actuated by the movement of said levers, means for returning said levers to normal position and means operable from outside said casing for setting said levers at a distance from said normal position.

9. In a device of the character described, the combination of a weighted lever pivotally mounted, an index actuated by the movement of said lever from normal position and means for holding said lever away from normal position, said holding means being adjustable in position to vary the force required to swing said lever away from said holding means to actuate said index.

10. In a device of the character described, the combination of a weighted lever pivotally mounted to swing in a vertical plane, indicating means actuated by the movement of said lever and a stop for holding said lever away from normal position, said stop being adjustable in position to vary the force required to swing said lever away from said stop to actuate said indicating means.

In witness whereof, I hereunto set my hand this eighth day of February, 1926.

EDWARD R. SMITH.